Jan. 3, 1950            E. ORSHANSKY, JR           2,493,417
APPARATUS FOR EFFECTING SPEED CHANGES
IN MECHANICAL TRANSMISSIONS

Filed Nov. 3, 1945                                        6 Sheets-Sheet 5

INVENTOR
ELIAS ORSHANSKY JR.
BY
Fay, Golrick, & Fay.
ATTORNEY

Jan. 3, 1950 E. ORSHANSKY, JR 2,493,417
APPARATUS FOR EFFECTING SPEED CHANGES
IN MECHANICAL TRANSMISSIONS
Filed Nov. 3, 1945 6 Sheets-Sheet 6

INVENTOR
ELIAS ORSHANSKY JR.
BY
Fay, Golrick, & Fay.
ATTORNEY

Patented Jan. 3, 1950

2,493,417

UNITED STATES PATENT OFFICE 2,493,417

APPARATUS FOR EFFECTING SPEED CHANGES IN MECHANICAL TRANSMISSIONS

Elias Orshansky, Jr., Stamford, Conn., assignor to Donald W. Hornbeck, Cleveland, Ohio Application November 3, 1945, Serial No. 626,552

35 Claims. (Cl. 74—116)

This invention relates to mechanical torque stabilizers in impulse transmissions and has for its general object the provision of a dual clutch mechanism which will serve the usual purpose of coupling a driving member to a driven member during a power transmission impulse of the driving member, and also will serve the purpose of eliminating the variations and impact fatigues heretofore characteristic of intermittent clutching variable speed transmisions. The clutch mechanism is caused to drivingly couple the driven member to the driving member for short periods, thereby to obtain velocity regulation of the driven member by the driving member until a succeeding driving impulse is exerted upon the driven member whereby repetitive stress releases are avoided and the torque relationship between the driving and driven members substantially is maintained.

Uniformity in torque is maintained by the use of the invention, for example in variable speed transmission devices of the multiple crank and clutch type wherein speed variation is obtained by shifting the position of an eccentric means which determines the rate of oscillation of the crank members. Heretofore attempts have been made to utilize a plurality of overrunning clutch mechanisms in variable speed transmission mechanisms of the above referred to type and which served to clutch or couple the crank hub to a planet gear carried by a driving member whereby the crank transmitted rotative motion to the sun gear during part of the oscillating motion of the crank arm. The velocity of the crank arm motion is inherently variable and the crank arm with an overrunning clutch will not be effective to drive the output or driven member until such time as its hub motion attains the speed of the driven member and then tries to exceed the speed of the driven member. At this time the crank member will accelerate the driven or output member. However, as the oscillating movement of the crank arm begins to slow down the driven member will try to maintain its velocity due to inertia, but its speed will tend to decrease until a succeeding crank arm and clutch mechanism drivingly engages it. Thus the torque is exerted in an impulse or intermittent manner and continuous transmission is not possible regardless of the number of crank and clutch mechanisms utilized. This non-conformity of velocities and torsional stress release are the cause of losses in transmission efficiency and the cause of shock stresses which require an over designing of the various parts of the mechanism to prevent physical failures.

Wherefore a more specific object of the present invention is the provision of a method and means of maintaining a substantially uniform torque effort between the driving and driven elements of a variable speed transmission mechanism of the type above referred to and whereby velocity and acceleration fluctuations and resultant stress fluctuations, strains and fatigues, heretofore inherent in such mechanisms, are eliminated or minimized to such an extent as to be within the bounds of practical limits.

A further object of the present invention is the provision of variable speed transmission mechanism of the general class referred to above and wherein a novel reversible clutching means is utilized to overcome the impact deficiencies of overrunning clutch mechanisms heretofore proposed for transmission mechanisms of the eccentric and crank type and whereby a substantially uniform torque delivery at the output end is obtained regardless of the speed change setting or the direction of rotation of the output shaft.

Another object of the present invention is the provision of a reversible output variable speed transmission which is amenable to a wide range of practical designs adaptable to a variety of transmission uses.

In the drawings, the invention, for the purposes of illustration, is shown as being incorporated in a variable speed transmission mechanism comprising six planet gear and clutch units mounted in a rotating cage or frame which is coupled directly to the driving medium. The planet gears are in mesh with and revolve about a central pinion or gear which is connected to the driven element or output end of the transmission mechanism. The driving element, the cage and the driven element are coaxial. Mounted upon the rotating cage and rotatable therewith are six clutch actuating means in the form of cam actuated levers having rollers thereon which follow the surface of a cam fixed to the stationary casing of the transmission mechanism. Adjustably supported by the stationary casing mechanism is an eccentric mechanism in the form of a ring member having an annular channel in which the free ends of cranks are disposed and which at predetermined periods drive the planet gears. The axial center of the annular channel can be disposed coincident with the axis of the driving and driven elements, or can be disposed eccentrically on either side for varying the speed and the direction of the output or driven element as desired.

Thus.

Figure 1:
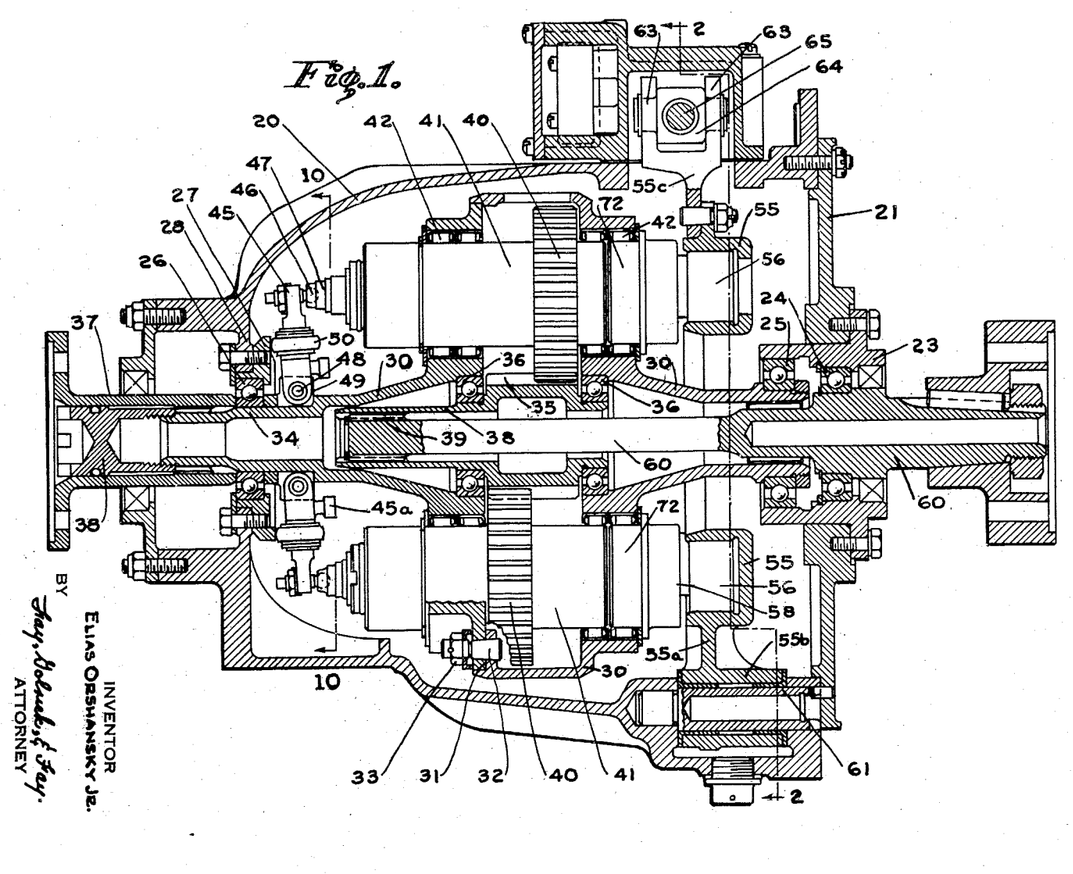
Fig. 1 shows such a variable speed transmission mechanism in cross-section, the section being taken through a vertical central plane of the mechanism.

It will be noted in Fig. 1 that the six planet gear mechanisms may be compactly and operatively arranged within a non-rotating housing or casing structure 20. The casing 20 is formed to have an end opening of sufficient size to permit the various sub-assemblies comprising the active parts of the transmission mechanism to be inserted. This end of the casing may be closed by a bearing plate 21 which supports a bearing supporting collet 23. The member 23 supports bearing members 24 and 25, referred to in more detail hereinafter. The opposite end of the casing is formed to support a bearing 26 indirectly by supporting an annular fixed cam member 27 bolted to the end wall formation 28 of the casing. The driving mechanism of the transmission comprises a rotating cage structure 30 which is supported at the input end of the casing by the bearing 26 and at the output end by bearing 25. The cage 20 may be made in two halves for purposes of convenient assembly and may be joined as indicated at 31 in any suitable manner, such as by tapered studs 32 and locking nuts 33 which firmly connect the two halves of the caged structure together. The axially hollow formation of the cage structure 30 is such as to rotatably support a driven pinion 35 on bearings 36 in coaxial relation to the driving element. Thus the hub or central part of the cage structure may take the form of a hollow spindle with the bearing part 34 extending outwardly at the input end to afford a splined connection to a flanged coupling member 37 to afford connection to a source of power. A nut 38 serves to retain the parts comprising the input end of the cage structure in precisely assembled relation, as shown.

The cage 30 rotatably supports six planet gears 40 in meshing relation with the pinion 35. These planet gears are disposed in staggered relation as shown in Fig. 1 for the purpose of obtaining compactness in design. The planet gears may be integrally formed on clutch sleeves 41 supported by needle bearings 42, whereby gears and sleeves 40—41 are rotatably mounted or supported by the cage 30.

Figure 10:
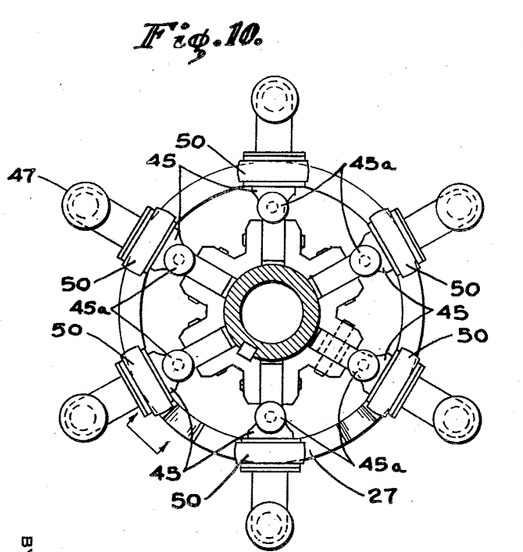
Fig. 10 is a cross-sectional elevation taken substantially along the line 10—10 of Fig. 1 to show the radial relation of the six clutch operating means on the cage relative to the cam means fixed to the casing of the mechanism.

Dual clutch mechanism, to be hereinafter described in considerable detail, are disposed within each of the planet gear sleeves 41 and these clutch mechanisms are operated in sequence by clutch operating levers 45, having ball joint connections 46 with thrust blocks 47 which operate extending parts of the clutch mechanisms, as will be described. The levers 45 are pivotally mounted on pins 48 and the pins extend through lugs 49 integrally formed to extend radially on the cage 30, (see Fig. 10). The levers 45 have cam rollers 50 mounted thereon, which rollers ride upon the face of the annular cam member 27 in a manner and for the purpose to be hereinafter described.

The planet gears 40, when being revolved about the driven pinion 35 by the rotating action of the cage 30, will have imparted thereto either an increased or decreased motion, depending upon the setting of the eccentric ring. This ring comprises a member 55 having a ring channel formed therein to receive anti-friction blocks 56, see Figs. 1 and 2. These blocks are pivotally connected to the crank pins 57 of the crank arms 58 and the crank arms 58 may be an integral part of clutch sleeves 59, see Fig. 5. The ring 55 is shiftable and may have an integral extension 55a thereon to afford a hub formation 55b, the hub part being mounted upon a pin or pivot stud 61 secured to the casing 20, as shown in Fig. 1. The opposite side of ring member 55 may be provided with a yoke-shaped bifurcated extension or member 55c. The bifurcated parts of the yoke 55c extend upwardly on each side of a screw member 65 which carries a screw block 64. Pin extensions 63, formed on opposite sides of the screw block 64, carry block members 62 which engage in the bifurcations of the yoke member 55c. The threaded engagement of block member 64 with the controller or adjustable screw member 65 affords a means of swinging the channeled ring to displace its center relative to the axes of the driving and driven elements. The casing structure 20 is shaped to house the screw member 65 to support it on bearings. Thus, a radial thrust bearing 66 supports one end of the screw and a needle bearing 67 supports the opposite end of the screw. An extension 65a of the controller or adjusting screw 65 may be operated by any suitable or desirable controller mechanism, depending upon the environmental use of the transmission mechanism.

Figure 2:
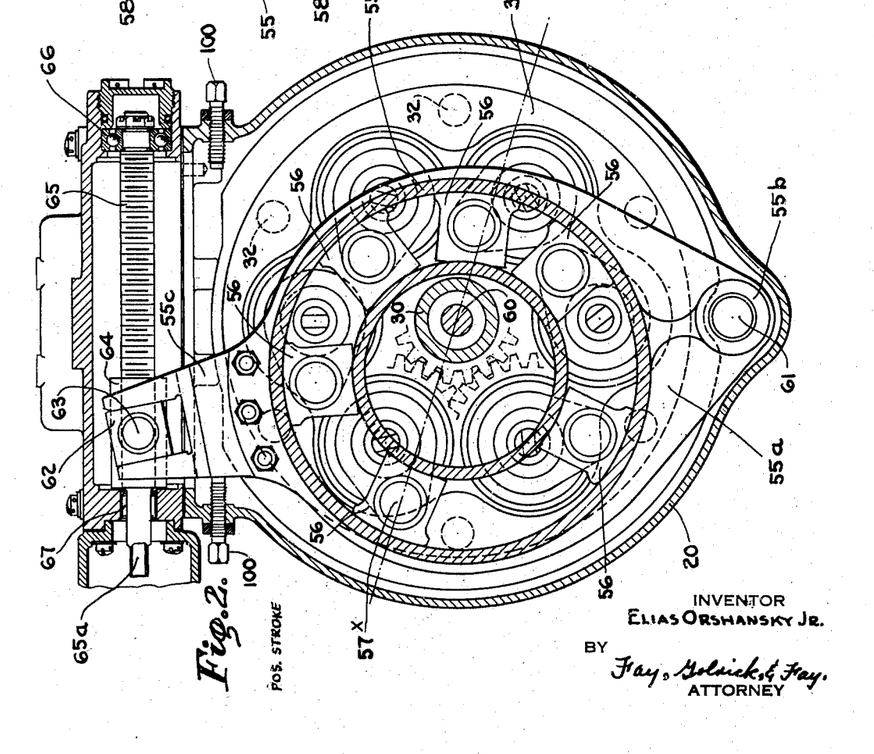
Fig. 2 is a cross-sectional elevation taken through the transmission mechanism substantially along planes indicated by the irregular line 2—2 in Fig. 1.
Figure 3:
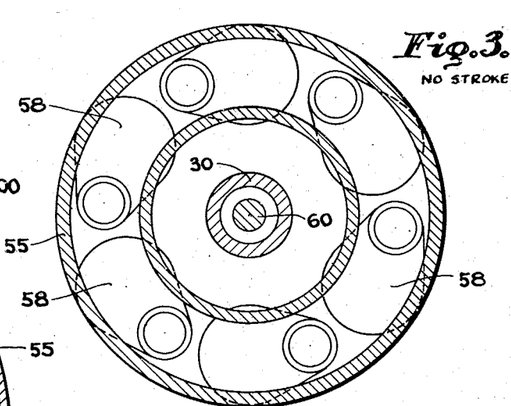
Fig. 3 is a diagrammatic representation of the eccentrically adjustable channeled ring when set with the center thereof coincident with the axes of the driving and driven elements and at which point no driving action of the crank members is effective upon the planet gears.
Figure 4:
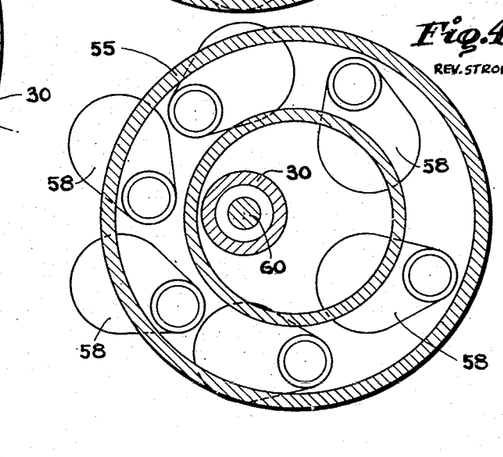
Fig. 4 shows another setting of the channeled ring member at a maximum reverse position relative to the position thereof as shown in Fig. 2.

It will be seen by viewing Figs. 2, 3 and 4 that the channeled ring member 55 may be swung about its pivot pin 61 to either the left or the right-hand positions, as shown in Fig. 2 and Fig. 4, as well as to any intermediate positions between these two extremes, including the neutral or coaxial position illustrated in Fig. 3.

The output or driven part of the transmission mechanism embodies a torque stress accumulator arrangement which takes the mechanical form shown in Fig. 1 of the present transmission mechanism. This arrangement is embodied in the form of an elongated driven shaft 60 which is extended through the driven pinion 35 and toward the driving end of the transmission mechanism for the purpose of increasing the length of the driven shaft without increasing the overall length of the transmission mechanism. Accordingly the driven pinion is hollow in construction and is provided with an integral sleeve 38 having an internal splined tight connection 39 with the inner end of the driven shaft 60. As stated, the outer enlarged end of the driven shaft is supported by the bearing 24. The diameter of the smaller part of the driven shaft is determined by a torsional factor to be explained.

Generally, the function of the embodiment of the invention as so far set forth comprises a multiple planetary gear eccentric ring type of variable speed transmission. However, it will be seen that there are certain novel arrangements of the parts thereof directed to the elimination of the inherent defects of such types of transmissions.

Figure 12:
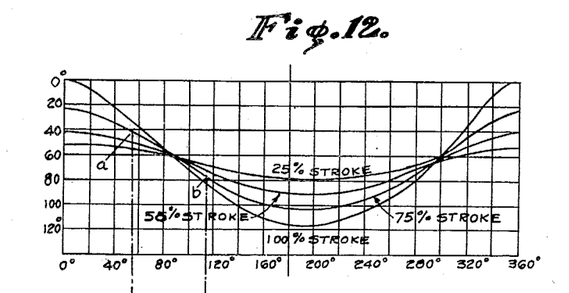
Fig. 12 is a graphic representation of the variation in the crank movement per 360° rotation of the cage when the ring is set eccentric relative to the axis of the drive and driven elements for various different speed changes to be effected.

For instance, the above described transmission mechanism is so designed as to utilize the deflections of the active elements of both the driving and driven sides of the mechanism by the use of a novel clutching mechanism operatively disposed between the driving and driven sides of the transmission mechanism to be drivingly effective only during that portion of the oscillation of the crank 58 or its clutch sleeve 59, which approximates a uniform velocity of the planet gear 40. The crank motion is not a uniform harmonic motion in its forward and reverse oscillatory movements due to the fact that the channel ring is displaced to either one or the other side of the axis of the revolving motion of the crank axis, i. e., the axis of cage 30. Fig. 12 diagrammatically illustrates the crank motion relative to the axis of the driven member for four settings of the eccentric ring and it should be noted that each 180° or half of the curve is not symmetrical relative to the other half of the curve. The ordinate is the scale in degrees of the oscillatory movement of the crank relative to its own axis and the abscissa is representative of the cage movement. The 0° position of one revolution of the abscissa corresponds to the remotest position of the crank pin 57 from the axis of the cage 30 in its travel in the channel of the eccentric ring. In Fig. 2, pin 57x and cage 30 are shown to be in such zero position. When the eccentric ring is set to have its center coincident with the axis of the cage, i. e., the axis of the driving and driven members, the curves of Fig. 12 become straight lines since there is no oscillatory movement of the crank arms.

Figure 13:
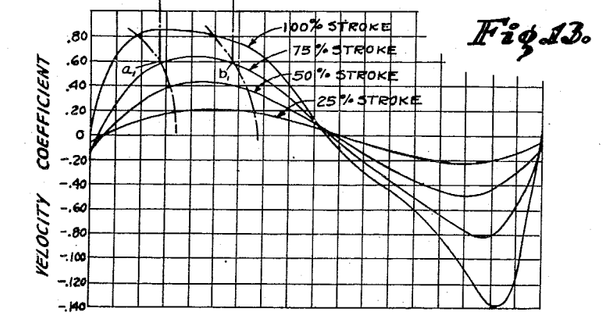
Fig. 13 is a velocity diagram of the crank arm movement showing the change in velocity of the crank arm and parts activated thereby during one revolution of the planetary gear cage.

In Fig. 13 velocity curves (per an assumed R. P. M. of the driving end) are shown as being representative of the change in the velocity of the crank arm movement end of the hub or clutch sleeve 59 for the four eccentric ring settings represented in Fig. 12. It is notable that all semblance of symmetry between the two halves of each of these curves is absent. The problem then is to select those portions of the crank arm movements on the velocity curve which will approximate a uniform velocity and thus determine the part of the arc of effectiveness of the crank arm movement which is to be used. Also, during substantially the first half of the curve the crank pin is moving toward the center of the transmission and during the remaining part of the curve the crank pin is moved away from the center of the transmission. If the crank were fixed to planet gear 40, then the crank arm movement during the first half of the curve is such that the driving speed of the plant gear 40 would be increased and during the remainder of the curve the speed of the planet gear would be decreased but only a part of the crank arm movement is utilized for both over and under drive purposes. In selecting the points at which the cam must lock and unlock the clutch unit the following factors must be given consideration.

1. The portion or portions of the curve must lie almost on a straight line.

2. There must be no sharp angles of the tangents to the velocity curve at the time one clutch unit locks and the preceding clutch unit unlocks.

3. The average slope of the displacement curve must be steep enough to produce the desired rotational velocity of planet gears 40 (in either direction) as this reflects in the speed of the output shaft 60 and its gear 35.

Referring again to Fig. 2, a dot and dash line extends through the center of the crank pin 57x and the axis of the cage 30. As the crank pin traverses the lower half of the ring channel it is swinging away from the center of the axis of cage 30 and toward this center when traversing the upper half of the channel. The direction of rotation of the cage is clockwise, as viewed in Fig. 2. When the crank pin is oscillating away from the axis of the cage and should the crank be clutched to the planet gear 40 during part of this movement, then an overdrive effect can be obtained. When the crank is oscillated toward the cage axis and should the crank be clutched to the planet gear 40 during part of the movement, then an under drive will be effected. Hence, if the eccentric or channeled ring 55 is shifted to the extreme right position as viewed in Fig. 2 the change from over drive to under drive will be effected and this can result in a reverse driving of the output shaft by determining the proper ratio of the planet gear 40 and the sun gear 35. The ratio shown in the drawings is approximately 2 to 3.

Figure 14:
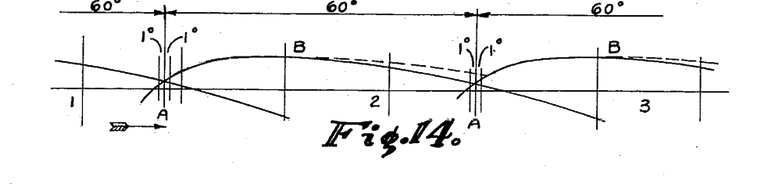
Fig. 14 is a graphic representation of the relative velocities of the crank arm movements of the cranks of two adjacent clutching mechanisms at the critical engaging and disengaging points thereof.

Referring to Fig. 12, it will be seen that between the points $a$ and $b$ (approximately 60°) the curve is about equal to a straight line and the swinging movement of the crank pin is substantially uniform. Also there is only a small change in the velocity as indicated by that part of the velocity curve between the points $a'$ and $b'$ in Fig. 13. Referring to Fig. 14, it will be seen that if the clutch is operated to disconnect the crank arm of one unit at point $b$ while the clutch of the succeeding unit is operated to connect the crank arm and planet gear thereof at point $a$, the terminating of the driving action of one unit and the commencing of the driving action of the following unit takes place substantially at points 60° apart in the rotary movement of the cage. A 2° overlap in these two actions is indicated in Fig. 14 since it has been found that this amount of overlap is within the realm of mechanical practicability by use of the present invention. If this timing condition, however, were the only major factor of consideration a simple clutching mechanism would suffice if efficiency were to be disregarded.

Now the straight line section a—b of the curve was selected from the overdrive part of the crank arm motion. As stated, the under drive part of the crank motion curve is not symmetrical with the over drive contour. This disparity is at a maximum when the eccentric ring is set for maximum oscillation of the crank arms and decreases as the ring is moved toward concentricity with the axis of the cage. Hence that part of the substantially straight portion of the motion curve is selected which will more nearly conform to a corresponding straight line stretch of the under drive part of the curve displaced 180° from the overdrive part of the curve to be used. In Fig. 13 the curve for the maximum position of eccentric ring (100% stroke) shows a serious irregularity between the overdrive and under drive parts of the curve but the velocity curves for a 75% setting and thereunder are closer to being symmetrical. In the present design accordingly the eccentric ring can be confined to a maximum not in excess of 75% of its possible physical displacement.

I propose to meet these seemingly adverse conditions by providing a two-way acting clutch mechanism operatively arranged between the crank arm sleeves 59 and the planet gear sleeves 41 which will serve to prevent torque variations between the driving and driven elements during the declutching action of one planetary unit and until the succeeding clutching unit has taken up the load. The clutching mechanism acts in such a way that a substantially uniform torque is maintained upon all of the elements despite the successive clutching and declutching actions for I propose to utilize the "fly wheel effect" of the revolving mass of elements and the dynamic stress forces existant therein to maintain such uniformity.

Referring to Figs. 5 to 9 inclusive, I show two-way simultaneously controlled clutch mechanisms comprising oppositely active expandable and contractable spring clutch members 70 and 71 operatively disposed between the planet gear sleeve 41 and the crank sleeve 59. The spring clutch member 70 will be referred to as the primary clutch and the member 71 as the secondary clutch. The mechanism for controlling the periodic clutching action of these helical spring members is such as to be independent of the oscillating motion of the crank arm as the pin of the arm traverses the channel of the eccentric ring, even though the driving action of the crank arm sleeve has a clutch locking influence upon the primary clutch as long as the velocity of the crank arm sleeve tends to exceed the velocity of the planet gear 40.

Figure 5:
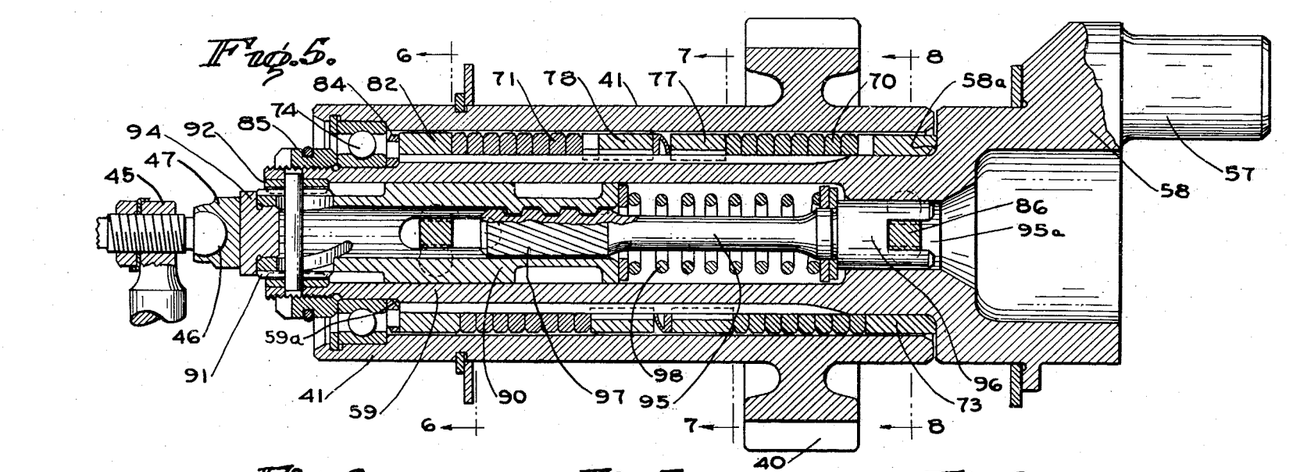
Fig. 5 is a cross-sectional view taken through the axis of one of the planet gears and its associated crank and clutching mechanisms.
Figure 6:
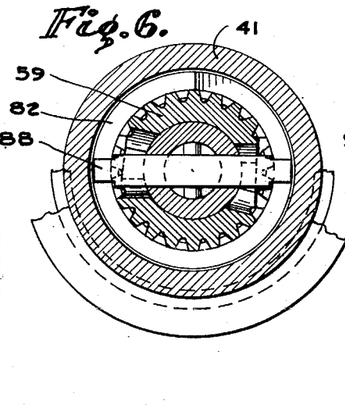
Figs. 6, 7 and 8 are cross-sectional views of the clutch mechanism and planet gear unit taken substantially along the lines 6—6, 7—7 and 8—8, respectively, of Fig. 5.
Figure 7:
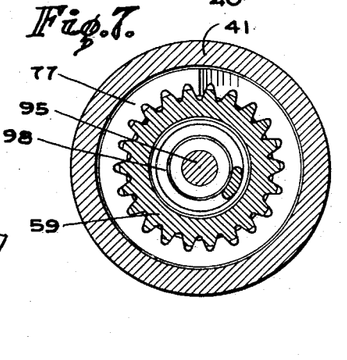
Figure 8:
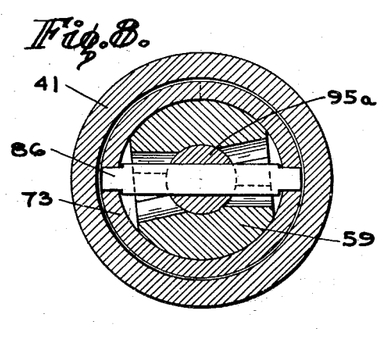

The spring clutch members 70—71 are shown in cross-section in Fig. 5 as being formed of a spring rod or wire substantially rectangular in cross-section and of such dimension as to fill substantially all of the radial space between the crank sleeve 59 and the planet gear sleeve 41. The crank sleeve 59 is mounted within the gear sleeve 41 to be rotatable relative to the gear sleeve 41 and its planet gear 40. A plain bearing surface 72 is formed upon the crank sleeve adjacent the crank end thereof for roller bearings 42 and a radial bearing 74 is disposed at the opposite end of the sleeve.

Figure 9:
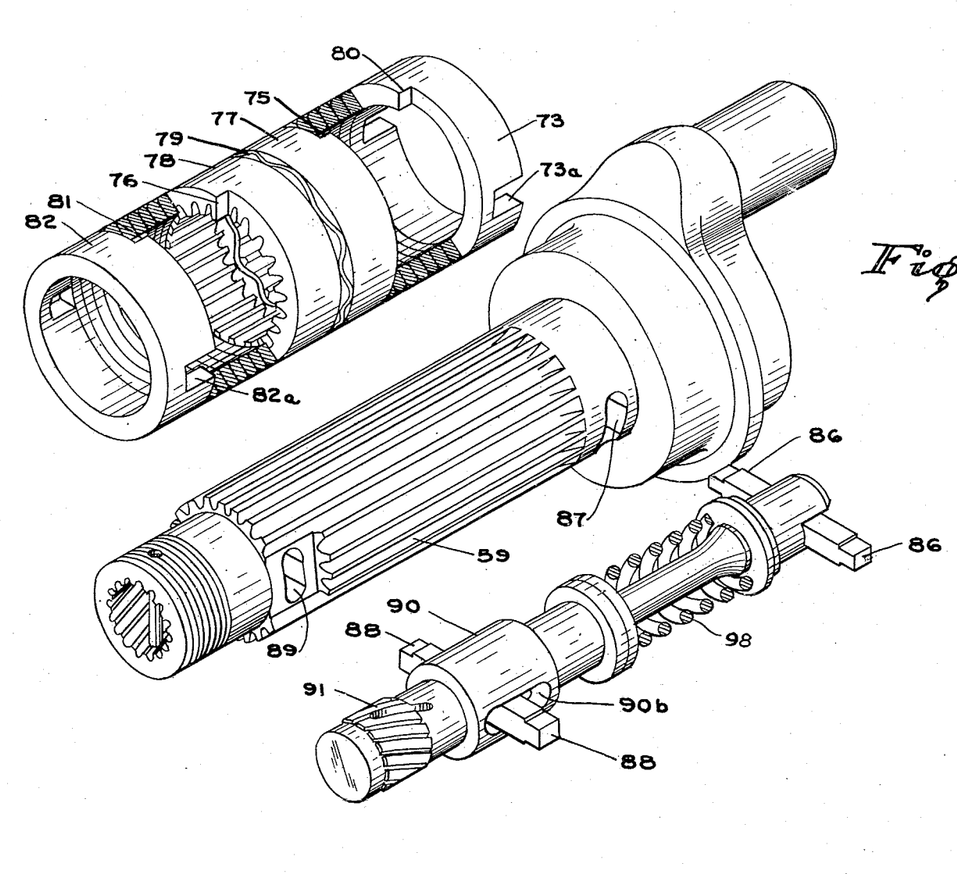
Fig. 9 is a perspective exploded view of the crank and clutch mechanism shown in Fig. 5 with the sleeved planet gear omitted from the indicated assembly.

The inner ends of the spring clutch members 70—71 are arranged to abut shoulders 75 and 76 respectively formed on collar members 77 and 78; the latter being slidably but non-rotatably mounted upon the crank sleeve 59. This connection may be in the form of a spline as shown in Fig. 9. A spacer in the form of a spring washer 79 is disposed on the crank sleeve between the two collar members as a safety factor for longitudinal variations of the spring clutch members. The outer end of the primary spring clutch member 70 abuts a shoulder 80 formed on the collar member 73 and the outer end of the spring clutch member 71 abuts a shoulder 81 formed on a collar 82 loosely carried on the splined part of the crank arm sleeve and which does not have a splined connection therewith.

A slight relative revolving of the shoulders 80 and 75 will cause a radial expansion or permit inherent contraction of the convolutions of the spring clutch member 70 and a like revolving of the shoulders 76—81 has a like effect upon the spring clutch member 71. Since the middle collars 77—78 are loosely splined to the crank sleeve 59, the end collars 73—82 carrying shoulders or abutments 80—81 respectively, are arranged to have a limited revolving motion upon and relative to the crank sleeve 59, a slight counter-clockwise movement of the collar 82 as viewed in Figs. 5 and 9 will cause spring clutch member 71 to expand against the internal cylindrical surface of the planet gear sleeve 41, but normally the member 71 will not grip the sleeve. Since spring clutch member 70 is oppositely active, a clockwise movement of collar 73 will cause the spring clutch member 70 to expand against the internal surface of the planet gear sleeve and the crank sleeve is thus clutched to the planet gear. It will be apparent that the clutch spring member 71 is poised immediately to drivingly engage the planet gear sleeve 41 upon a change or decrease in velocity of the driving action of the crank sleeve 59 and the clutch spring member 71. The clutch spring actuating collars can be brought into adjustment and a practical means for maintaining such an adjustment as well as for effecting slight revolving actuation of the collars relative to the crank sleeve 59 will now be described.

It will be noted that collar 73 has one end thereof abutting a shoulder 58a of the crank arm formation and that collar 82 abuts a spacing ring 84. This spacing ring is held against a shoulder 59a on the crank sleeve by a lock nut 85 which presses the inner race of the bearing 74 against collar 84. The collars 73 and 82 are provided with square-shaped radial slots 73a and 82a respectively, which receive the ends of square bars 86 and 88. These bars extend through radially formed openings 87 and 89 respectively, in the wall of the crank sleeve 59.

Cam operated means are provided for causing a partial revolving motion of the bar 88 in one direction and bar 86 in the opposite direction simultaneously to allow the spring clutches to contract and this motion is effected by mechanism disposed within the crank sleeve 59 and arranged to be operable longitudinally of the crank sleeve axis. The reverse of these motions to condition the spring clutches to clutch is obtained by precompressed spring means which effects the expanding of the spring clutch members. Thus, disposed within the crank sleeve is a clutch operating sleeve member 90 having a helical gear formation 91 on an outer end thereof and which is in engagement with an internal helical gear formation of a sleeve member 92 secured within the outer end of the bore of the crank sleeve. A pin 93 serves to lock the internal gear sleeve 92 in place upon the crank sleeve and the clutch operating sleeve 90 has helically formed slots therein through which pin 93 extends. The helix of these slots corresponds to the helix of the gear teeth 91. Hence, longitudinal movement of the sleeve member 90 relative to the crank sleeve 59 will cause the sleeve 90 to revolve to a limited extent. The clutch operating sleeve 90 is provided with two diametrically opposite slots 90b through which the clutch operating bar 88 extends and accordingly the bar 88 and the collar 82 are revolved also to a limited extent when the sleeve 90 is revolved by longitudinal shifting thereof.

The clutch operating bar 86 is turned or operated by a rod 95 having an enlarged end 96 disposed in a reduced bore of the crank sleeve and is slotted at 95a to span and engage the clutch operating bar 86. The inner end of rod 95 is provided with a helical gear formation 97 which extends into and engages an internal helical gear formation in the inner end of clutch operating sleeve 90. This formation is generally the same as the helical gear formation 91—92 with about one-half the helix angle and the bars 88 and 86 are always rotated in opposite directions. This action is due to the fact that, longitudinally, internal spline 92 is stationary and one end of internal spline 97, i. e. bar 95, is longitudinally stationary. In certain load designs the helical spline relationship 91—92 may be omitted entirely. A precompressed spring member 98 is in thrust relation to the inner end of the clutch operating sleeve 90 and the head 96 of the rod 95 and tends to longitudinally separate the sleeve 90 and rod 95; i. e., it tends to maintain both spring clutch members 70—71 expanded against the internal surface of the planet gear sleeve and would do so if not prevented by external means. The outer end of the clutch operating sleeve 90 is closed by a thrust plug 94 secured to the operating sleeve in any convenient manner and the outer end of plug 94 is provided with a smooth hardened face in contact with the adjustable cam operated member 47. Hence cam 27 is effective to move the clutch operating sleeve 90 from left to right, as viewed in Fig. 5, and spring 98 is opposed and the sleeve 90 is maintained in such position that the clutch spring members 70—71 will not be expanded during substantially five-sixths of the revolution of the cage.

Thus the clutch operating sleeve 90 and its clutch spring operating bar 88 and the rod 95 and its clutch spring operating bar 86 are revolvable relative to the crank sleeve 59 to the limited extent of the arcuate slots 89 and 87 but in actual operation only a part (about 12°) of this limit available movement is needed. It will now be obvious, however, that when the clutch operating sleeve 90 is moved outwardly upon cam release of the lever 45 and the action of the spring 98 during rotation of the cage 30, sleeve 90 will be caused to revolve slightly relative to the crank sleeve, thus revolving bar 88 and collar 82 in a counter-clockwise or spring clutch expanding direction. During this action the collar 73 is shifted in a clockwise direction by reason of the helical connection 97. This expanded condition of both spring clutch members exists for substantially one-sixth of a revolution of the cage. The adjustment of the member 47 is such that the "in" position of the clutch operating sleeve 90 remains at the position shown in Fig. 5 throughout substantially five-sixths of each revolution of the cage 30, during which the spring clutch members are contracted and out of contact with the internal surface of the planet gear sleeve.

Figure 11:
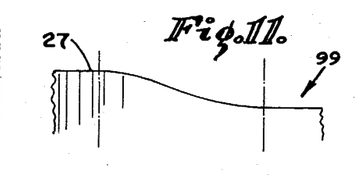
Fig. 11 is a fragmentary edge view of the riser formation of the cam shown in Figs. 1 and 10.

When the cage brings lever 45 and its cam roller 50 to the cam depression 99 (see Figs. 10 and 11) the spring 98 causes relative axial movement of the sleeve 90 and rod 95 and the spring collar 73 is so positioned that the primary clutch spring 70 has expanded and has drivingly coupled the crank sleeve 59 to the planet gear sleeve 41 and the crank arm is driving the planet gear 40. The secondary spring clutch 71 and its operating collar 82 are also so positioned that any tendency of the crank sleeve to lag, due to a drop in the velocity of the crank sleeve, will cause slight expansion of clutch spring 71 and thus effect a driving relation between the rotating planet gear sleeve 41 and the crank sleeve 59. This action only takes place at substantially the point of termination of the driving action of the primary spring clutch member 70 upon the planetary gear 40.

It will be seen that this function of the secondary spring clutch 71 is to prevent practically any releasing of the torque stress relationship between the crank sleeve and the planet gear sleeve until such time as the succeeding crank and planetary unit has taken up the driving load. Hence an overlapping of successive clutching actions becomes possible and the energy stored in all of the rotating elements of the transmission mechanism in the form of dynamic stress factors is not released at any point in the successive clutching and declutching actions. To further the storing of such dynamic energy the driven shaft 60 is purposely reduced in diameter to permit a certain safe amount of torsional deflection to take place therein.

It should also be noted that the critical part of the operation of the secondary clutching mechanism is not dependent upon a precise cam action and cage movement for the secondary clutch actuation is brought about by the spring 98 plus any tendency to the primary clutch mechanism to ease up in its torque effort.

This clutching function of the secondary clutching mechanism, while seemingly anomalous, has the effect of maintaining a substantially uniform velocity of the driven or output shaft 60 and also eliminates shocks and consequent depreciation of the operating parts of the mechanism.

In the particular design shown in the drawings the maximum angular displacement of the channel ring 55 in either direction from concentricity with the axis of the driving and driven shafts is approximately 10°. The crank arm radius is ⅞" and the radius of the revolving axes of the crank arms and of the channel center is 2⅛". It has been found that a change speed ratio for best efficiency is available when the eccentric ring has been displaced not more than three-fourths of its possible displacement and for many purposes the included range of speed changes for both over and under drive which is available within the three-quarter displacement limits of the ring, will meet most practical requirements. Accordingly I may avoid the seemingly unfavorable velocity change conditions indicated at maximum ring displacement by limiting the displacing action of the controller screw 65 and its center block 64. This may be done by the use of stops which may be in the form of adjustable screw members 100 or by any other suitable means.

Referring again to the velocity chart in Fig. 13, it will be noted that the selected 60° reach of the seventy-five per cent curve is not coincident with the stretch a'—b' of the 100% curve but has been shifted toward the right of Fig. 13. A further shifting to the right is to be noted in the selected parts of the 50% and the 25% curves. Should the cam 27 be fixed as shown in Fig. 1, then it would be desirable to select the average position represented by that part of the crank motion corresponding to the stretch a' to b' of the 50% curve. Corresponding shiftings are indicated when the eccentric ring is moved to the under drive position.

Figure 15:
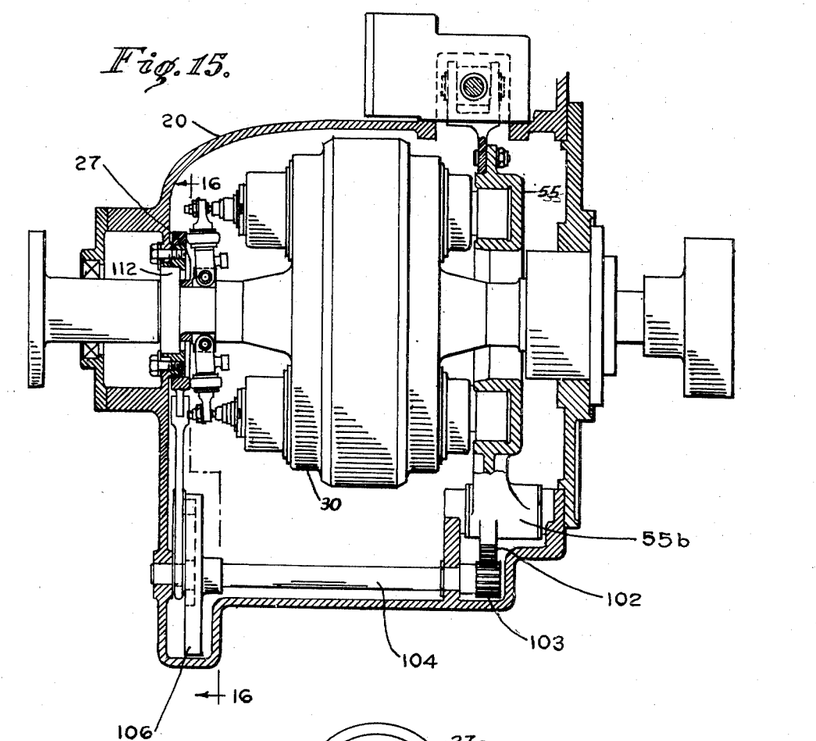
Figs. 15 and 16 show a modified embodiment of the invention.
Figure 16:
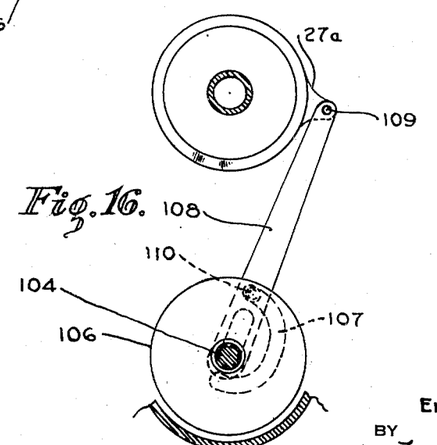

In Figs. 15 and 16 I show an arrangement whereby the correct position of the cam 27 relative to the selected part of the crank motion to be utilized for driving, can always be obtained. The cam is revolved in synchronism with the arcuate shifting of the eccentric ring. Thus the hub structure of the eccentric ring 55 is provided with a segment gear part 102 which meshes with a pinion 103 on a shaft 104 supported by the casing as shown.

Shaft 104 carries a cam 106 having a cam slot 107 formed in a side face thereof. A link 108 is bifurcated at one end to ride upon shaft 104 and the other end is pivotally connected by pin 109 to an arm 27a formed to extend from the perimeter of the cam 27. A roller 110 is mounted on the link to operate in the cam slot 107. The contour of the cam slot 107 is developed so that the link 108 will revolve the cam 27 in such manner as to correspond with the desired angular displacement thereof, indicated by the dot and dash lines shown in Fig. 13. The cam 27 may be supported upon a ring 112 fitted to an end wall 28 of the casing 20. By this arrangement the amount of allowable deflection of the various elements can be reduced since the difference between the normal velocity of the planet gear sleeve 41 and the crank sleeve are more proximate for any speed change position of the eccentric ring.

Summarizing the functions of the double clutch arrangement with reference to the full line intersecting velocity curves shown in Fig. 14, it will be noted that at primary theoretical clutching point A the velocity of the crank arm or crank arm sleeve No. 1 is decreasing while the No. 2 primary clutch, about to take the load, is increasing and continues to do so to point B. After passing point B its velocity is decreasing as the No. 2 arm is carried through 60° of the cage movement. No. 3 crank arm then repeats the No. 2 action, etc. This would be the condition with the use only of the primary clutch. However, when the velocity of the crank arm sleeve begins to decrease at or immediately following point B the crank arm sleeve tendency to lag immediately causes the secondary clutch to drivingly connect the planet gear sleeve to the crank arm sleeve and the rate of velocity drop in the crank arm sleeve for the balance of the 60° period is lowered and this modified or higher velocity is indicated by the dash line curve. Hence the actual point of assumption of the load by a succeeding crank arm and its sleeve is a slight distance to the right of point A. It will be apparent that this prevention of a substantial part of the otherwise velocity drop drag of the crank sleeve upon the planet gear sleeve by utilizing the momentum of the driven parts of the transmission will result in the maintenance of a substantially uniform velocity of the driven parts as well as the driving parts for at no time during each 60° plus overlap period of clutch action are the driven and driving mechanical sides of the mechanism uncoupled.

To those skilled in the art it will be obvious that the torque or effort exerted upon the driven elements becomes stabilized to the point of substantial uniformity of applied effort. Despite intermittent clutching action, the secondary clutching mechanism is poised for instantaneous clutching action to effectively prevent dissipation of the stored energy in all of the stressed parts of the driven side of the transmission to the driving side of the transmission. The velocity of the driving and of the driven elements is being maintained substantially equal by the secondary clutching mechanism at the end of the arc of action of a preceding planetary unit, and preceding this termination of the primary clutching mechanism, the succeeding planetary unit has caused the crank thereof to assume the load at the point the succeeding crank velocity has reached, and tends to exceed, the velocity of the planet gear sleeve.

The particular design disclosed as stated incorporates a gear ratio of 3 to 2 between the planet gear and sun gear and a reverse in the direction of rotation of the output or driven shaft 60 is not obtainable. If the gear ratio of 4 to 2 is used the shaft 60 could then be driven in an overdrive and underdrive and in a reverse manner.

It will be noted that the spring clutch members have a common helix, i. e., both are wound in the same direction, but by operatively anchoring the inner adjacent ends thereof and by applying the expanding action or forces to the outer ends they are caused to be oppositely active. Other arrangements of the spring clutch structures and modifications of the operating means therefor and which can carry out the primary operating principle of substantially eliminating velocity and torque fluctuations in an intermittent driving type of mechanical transmission will be obvious to those skilled in the art. Accordingly such modifications are deemed to be within the scope of the present invention as defined in the appended claims.

I claim:

1. A clutching mechanism of the expanding spring type comprising oppositely active spring clutch members coupling a driving member to a driven member and coupling the driven member to the driving member, respectively, thereby to maintain a torsional relationship between the driving and driven members upon the driving release of one of the clutch members.

2. A clutching mechanism of the expanding spring type comprising oppositely active spring clutch members coupling a driving member to a driven member and coupling the driven member to the driving member, respectively, thereby to maintain a torsional relationship between the driving and driven members upon the driving release of one of the clutch members and means for simultaneously operating the spring clutch members.

3. A clutching mechanism of the expanding spring type comprising oppositely active spring clutch members coupling a driving member to a driven member and coupling the driven member to the driving member, respectively, thereby to maintain a torsional relationship between the driving and driven members upon the driving release of one of the clutch members and means operable independently of any transmission stresses for simultaneously operating the two spring clutch members.

4. In a variable speed transmission mechanism of the eccentric and multiple crank type in which crank mechanisms are oscillated and intermittently drivingly connected with a driven element, a clutch mechanism associated with each of the crank mechanisms and comprising a dual clutching means, one of the clutching means being effective to couple the crank mechanisms and driven elements of the transmission mechanism during a power transmitting movement of the respective crank mechanisms and the other clutching means being effective to maintain a torsional relationship between the crank mechanisms and the respective driven elements at the moment the first clutching means ceases torsional exertion upon the driven member.

5. In a variable speed transmission mechanism of the eccentric and multiple crank type in which crank mechanisms are oscillated and intermittently drivingly connected with a driven element, a clutch mechanism associated with each of the crank mechanisms and comprising a dual clutching means, one of the clutching means being effective to couple the crank mechanisms and driven elements of the transmission mechanism during a power transmitting movement of the respective crank mechanisms and the other clutching means being effective to maintain a torsional relationship between the crank mechanisms and the respective driven elements at the moment the first clutching means ceases torsional exertion upon the driven member and means for simultaneously operating the dual clutch means of the respective clutch mechanisms.

6. In a variable speed transmission mechanism of the eccentric and multiple crank type in which crank mechanisms are oscillated and intermittently drivingly connected with a driven element, clutch mechanisms associated with each of the crank mechanisms and comprising a dual clutching means, one of the clutching means being effective to couple the crank mechanisms and driven elements of the transmission mechanism during power transmitting movement of the respective cranks and the other clutching means being effective to maintain a torsional relationship between the crank mechanisms and the respective driven elements at the moment the first clutching means ceases torsional exertion upon the driven member and means operable independently of the crank movements for initiating operation of the respective clutch mechanisms.

7. A variable speed transmission comprising a drive shaft, a driving element in unitary relation to the drive shaft, planetary gears rotatably carried by the driving element, a driven shaft, a driven pinion in unitary relation to the driven shaft and in engagement with the planetary gears, oscillatable means operatively carried by the planetary gears for intermittently and successively driving the planetary gears to effect relative rotation between the driving element and the planetary gears, and means tending to concurrently couple the planetary gears in a driving relation to the oscillatable means to thereby control the rate of acceleration of the driven pinion during successive disengagements of the intermediate elements.

8. A variable speed transmission mechanism comprising a drive shaft, a driving element in unitary relation to the drive shaft, cam means fixed relative to the driving element, intermediate gear elements rotatably carried by the driving element, a driven shaft, a driven gear in unitary relation to the driven shaft and in engagement with the intermediate gear elements, oscillatable means operatively carried by the driving element for intermittently and successively engaging the intermediate gear elements to effect a rotation of the intermediate gear elements relative to the driving element, adjustable eccentric means acting on the oscillatable means to effect oscillation thereof, and clutch means for coupling the oscillatable means in a driving relation to the respective intermediate gear elements to thereby control the rate of acceleration of the driven gear and shaft during successive disengagements of the intermediate gear elements.

9. A clutching mechanism of the expanding spring type comprising oppositely active spring clutch members adapted to couple a driving member to a driven member and to couple the driven member to the driving member, respectively, thereby to maintain a torsional relationship between the driving and driven members upon the driving release of one of the clutch members and means operable independently of the torsional relationship of the coupled members to control the periodic operation of the clutching members.

10. A clutching mechanism of the expanding spring type comprising oppositely active spring clutch members adapted to couple a driving member to a driven member and to couple the driven member to the driving member, respectively, thereby to maintain a torsional relationship between the driving and driven members upon the driving release of one of the clutch members, and means for simultaneously retracting and expanding the spring clutch members intermittently.

11. In a variable speed transmission mechanism of the eccentric and multiple crank type, a plurality of planetary gear units, each unit comprising a clutch mechanism and an associated crank mechanism and a planetary gear, a sun gear driven by the planetary gears, said clutch mechanism comprising a primary clutching means and a secondary clutching means, one of the clutching means of each unit being effective to couple the crank and its associated planetary gear during a power transmitting movement of the crank, and the other clutching means being effective to maintain a torsional relationship between the planetary gear and the crank at the moment the first clutching means ceases torsional exertion upon the planetary gear.

12. In a mechanical transmission mechanism of the intermittent torque applying type, a primary and a secondary clutch mechanism operatively disposed between driving and driven elements of the transmission mechanism, the primary clutch mechanism serving to drivingly couple the driving element to the driven element during part of a revolution of the driving element and the secondary clutching element serving to couple the driven element to the driving element immediately upon a lag in the velocity of the driving element relative to the velocity of the driven element and means for initiating one and terminating the other of said clutching actions during a predetermined angular movement of the driving element.

13. In a mechanical transmission mechanism of the intermittent torque applying type, a primary and a secondary spring clutch mechanism operatively disposed between driving and driven elements of the transmission mechanism, the primary clutch mechanism serving to drivingly couple the driving element to the driven element during part of a revolution of the driving element and the secondary clutching element serving automatically to couple the driven element to the driving element immediately upon a lag in the velocity of the driving element relative to the velocity of the driven element, and clutch control means for initiating one and terminating the other of said clutching actions, said means being adapted to simultaneously expand both spring clutch mechanisms.

14. In a mechanical transmission mechanism of the intermittent torque applying type, a primary and a secondary clutch mechanism operatively disposed between driving and driven elements of the transmission mechanism, the primary clutch mechanism serving to drivingly couple the driving element to the driven element during part of a revolution of the driving element and the secondary clutching element serving to couple the driven element to the driving element immediately upon a lag in the velocity of the driving element relative to the velocity of the driven element and clutch control means for initiating one and terminating the other of said clutching actions including a cam fixed relative to the rotation of the driving element.

15. In a mechanical transmission mechanism of the intermittent torque applying type, a crank having a hollow sleeve, means for oscillating the crank, a planetary gear having a sleeve surrounding the crank sleeve, a primary and a secondary clutch mechanism operatively disposed between the sleeves, the primary clutch mechanism serving to drivingly couple the crank sleeve to the planetary gear sleeve during part of the oscillatory motion of the crank sleeve and the secondary clutching element serving to couple the planetary sleeve to the crank sleeve immediately upon a lag in the velocity of crank sleeve relative to the velocity of the planetary sleeve and means disposed within the crank sleeve for initiating one and terminating the other of said clutching actions.

16. In a mechanical transmission mechanism of the intermittent torque applying type, a crank having a hollow sleeve in telescoped relation to a planetary gear sleeve, means for oscillating the crank, a primary and a secondary spring clutch mechanism operatively disposed between the two sleeves, the primary clutch mechanism serving to drivingly couple the crank sleeve to the planetary sleeve during part of the oscillatory motion of the crank sleeve and the secondary clutching element serving to couple the planetary sleeve to the crank sleeve automatically upon a lag in the velocity of the crank sleeve relative to the velocity of the planetary sleeve and clutch control means disposed within the crank sleeve having clutch operating members extending through the wall of the crank sleeve for effecting expansion of said spring clutch mechanism.

17. In a mechanical transmission wherein a driving means has a variable velocity during its driving action, a driven means having substantially uniform velocity, a clockwise and counterclockwise acting spring clutching mechanism operatively disposed between the driving means and the driven means and serving to automatically reverse the torque transmitting relationship of the driving means and the driven means when the velocity of the driving means tends to fall below the substantially uniform velocity of the driven element and intermittently operated clutch operating means arranged to expand both spring clutch mechanisms simultaneously.

18. In a mechanical transmission wherein a driving means has a variable velocity during its driving action, a driven means having substantially uniform velocity, a clockwise and counterclockwise acting spring clutching mechanism operatively disposed between the driving means and the driven means and serving to automatically reverse the torque transmitting relationship of the driving means and the driven means when the velocity of the driving means tends to fall below the substantially uniform velocity of the driven element and clutch operating means acting on the spring clutching mechanisms in such manner as to expand and to permit contraction thereof intermittently.

19. In a variable speed transmission, a driving element, a driven element, a crank-gear and clutch unit carried by the driving element, fixed adjustable means acting on the crank for effecting a complete cycle of oscillatory movement of the crank when carried through one revolution of the driving element and the adjusting of said means determining the extent of such oscillation and the speed of the driven element, means acting on the clutch mechanism to cause the clutch to couple the crank to the gear during part of a revolution of the driving element and to maintain the clutch inactive during the remainder of the revolution of the driving element and means interconnecting the fixed adjustable means and the clutch actuating means for simultaneously adjusting the crank actuating means and the fixed adjustable means whereby the initiation of the clutching action will take place during a substantially constant motion part of the crank oscillation regardless of the selected position of said fixed adjustable means.

20. In a variable speed transmission, a driving element, a driven element, a crank gear and clutch unit carried by the driving element, an adjustable eccentric ring acting on the crank for effecting a complete cycle of oscillatory movement of the crank when carried through one revolution of the driving element and the adjusting of said ring determining the extent of such oscillation and the speed of the driven element, cam means acting on the clutch mechanism to cause the crank to be coupled and uncoupled to and from the gear during part of a revolution of the driving element and means interconnecting the eccentric ring and the cam means for simultaneously adjusting the cam means and the eccentric whereby the starting point of the clutching action may be shifted in conformity with a change in the motion of the crank consequent to a change in the eccentric ring position relative to the revolving path of the crank.

21. In a variable speed transmission of the eccentric and multiple crank type, a driving element, a plurality of planetary gear-crank and clutch units carried by the driving element, a gear driven by the planetary gears, an adjustable eccentric for operating the cranks, the adjusting of the eccentric determining the extent of the oscillation of the cranks and the speed of the driven gear, means acting on the clutch of said unit for causing the planetary gears to be driven by the crank action during a selected part of the oscillatory movement of the cranks, and means connecting the eccentric and the clutch operat-

17 ing means for adjusting the clutch operating means in conformity with adjusted changes in the eccentric whereby selection of the part of the crank motion to be utilized for any adjusted position of the eccentric is obtained automatically.

22. In a transmission mechanism, a driving member, a driven member, said members being formed to have a cylindrical space therebetween, two spring clutch members disposed in said space, one of the spring clutch members being active clockwise and the other counter-clockwise, means attaching adjacent ends of the spring clutch members to the driving member, means revolvably movable relative to the driving member and adapted to engage the outer ends of the spring clutch members to effect expansion thereof into contact with the inner surface of the driving member and clutch operating means disposed within the driving member for effecting a revolving motion of the spring clutch expanding means.

23. In a transmission mechanism, a driving member, a driven member, said members being in the form of telescoped sleeves with a space between the walls thereof, two spring clutch members disposed in said space, one of the spring clutch members being active clockwise and the other counter-clockwise, means attaching adjacent ends of the spring clutch members to the inner sleeve, means revolvably movable relative to the inner sleeve adapted to engage the outer ends of the spring clutch members to effect expansion thereof into contact with the inner surface of the outer sleeve and clutch operating means disposed within the inner sleeve for effecting a revolving motion of the spring clutch expanding means.

24. In a transmission mechanism, two members in the form of telescoped sleeves with a space between the walls thereof, two spring clutch members disposed in said space, one of the spring clutch members being active clockwise and the other counter-clockwise, means attaching adjacent ends of the spring clutch members to the inner sleeve, means revolvably movable relative to the inner sleeve adapted to engage the outer ends of the spring clutch members to effect expansion thereof into contact with the inner surface of the outer sleeve, clutch operating means disposed within the inner sleeve for effecting a revolving motion of the spring clutch expanding means, there being radially disposed members extending through the wall of the inner sleeve to operatively connect the clutch operating means with the second mentioned means.

25. In a transmission mechanism, a driving member, a driven member, said members being in the form of telescoped sleeves with a space between the walls thereof, two spring clutch members disposed in said space, one of the spring clutch members being active clockwise and the other counter-clockwise, means attaching adjacent ends of the spring clutch members to the inner sleeve, means revolvably movable relative to the inner sleeve and adapted to engage the outer ends of the spring clutch members to effect expansion thereof into contact with the inner surface of the outer sleeve and clutch operating means disposed within the inner sleeve and connected to the expanding means for effecting a revolving motion of the spring clutch expanding means to simultaneously expand the spring clutch members.

26. In a transmission mechanism, a driving member, a driven member, said members being in the form of telescoped sleeves with a space between the walls thereof, two spring clutch members disposed in said space, one of the spring clutch members being active clockwise and the other counter-clockwise, means attaching adjacent ends of the spring clutch members to the inner sleeve, means revolvably movable relative to the inner sleeve and adapted to engage the outer ends of the spring clutch members to effect expansion thereof into contact with the inner surface of the outer sleeve and clutch operating means to expand simultaneously said spring clutch members.

27. In a transmission mechanism, two members adapted to be clutched together for torque transmitting purposes by spring clutch mechanism, two spring clutch members operatively disposed to clutch the two members together in a driving and driven relationship, one of the spring clutch members being active clockwise and the other counter-clockwise, and clutch operating means adapted to expand said clutch spring members simultaneously.

28. A clutching mechanism of the self-energizing type comprising two clutch means respectively adapted to couple a driving member to a driven member and to couple the driven member to the driving member thereby to maintain a torsional relationship between the driving and driven members upon the driving release of one of the clutch members and means operable independently of the torsional relationship of the coupled members to control the periodic operation of the clutching members.

29. A clutching mechanism of the self-energizing type comprising two clutch mechanisms respectively to couple a driving member to a driven member and to couple the driven member to the driving member thereby to maintain a torsional relationship between the driving and driven members upon the driving release of one of the clutch members and means for simultaneously conditioning the clutch mechanisms for self-energizing action.

30. In an eccentric and planetary gear type transmission a sun gear, a series of equispaced planetary gears meshing with the sun gear, an expanding spring clutch mechanism associated with each planetary gear and including a crank mechanism, an eccentric ring for oscillating the crank mechanisms, a driving element carrying the planetary gears and the associated spring clutch mechanisms rotatively about the sun gear, said spring clutch mechanisms being adapted to expand to clutch the planetary gear and its respective clutch mechanism in a driving action upon the sun gear when the velocity of the crank mechanism tends to exceed the normal rotative velocity of the planetary gear as the planetary gear is revolved about the sun gear by the driving element and torsional means connected with the sun gear and driven thereby and which when under load will accumulate sufficient torsional displacement to cause the sun gear to exert a reactive force upon the planetary gear and thereby prolong the period of driving connection between the crank mechanism and the planetary gear.

31. In an eccentric and planetary gear type transmission a sun gear, a series of planetary gears meshing with the sun gear, a driving element in the form of a cage rotatively supporting the planetary gears, a spring clutch mechanism associated with each planetary gear and including a crank mechanism, an eccentric ring for oscillating the crank mechanisms as the cage rotates and said cage carrying the planetary gears and associated spring clutch mechanisms rotatively about the sun gear, each of said spring clutch mechanisms being adapted to clutch the planetary gear and its respective clutch mechanism in a driving action upon the sun gear when the velocity of the crank mechanism tends to exceed the normal velocity of the planetary gear as the planetary gear is revolved about the sun gear by the cage and torsion storing means associated with the sun gear and driven thereby which when under load will accumulate sufficient reactive torsional force to cause the sun gear to exert a reactive force upon the planetary gear.

32. In a variable speed transmission, a rotatable driving element, a plurality of cranks carried by said element and translatably rotated about the axis of the element when the element rotates, said cranks being uniformly spaced about said element, a gear associated with each crank, clutch mechanisms for coupling each associated crank and gear, each of said clutch mechanism comprising a dual clutching means, one of the clutching means of each clutch mechanism being effective to couple the respective crank and its associated gear during a power transmitting movement of the crank and the other clutching means being effective to maintain a torsional relationship between the crank and its associated gear at the moment the first clutching means ceases torsional exertion upon the said associated gear, a gear driven by the first mentioned gears, means for effecting a complete cycle of oscillation of each crank about its axis during one revolution of the driving element, and means for rendering the respective clutch mechanisms operable when the cranks pass through a predetermined sector of the arc of revolution of the driving element, the last mentioned means being adapted to render a succeeding clutch mechanism operable prior to the release of the preceding clutching mechanism.

33. In a variable speed transmission, a rotatable driving element, a crank mechanism carried by said element and translatably rotated about the axis of the element when the element rotates, a gear associated with the crank, clutch mechanism for coupling the crank and gear, a gear driven by the first mentioned gear, means for effecting a complete cycle of oscillation of said crank about its axis during one revolution of the driving element and for selectively varying the degree of oscillation of the crank, and means for actuating said clutch mechanism during the time the crank mechanism passes through a sector of the arc of revolution of the driving element, the last mentioned means being affected by the first mentioned means for angularly shifting said sector of clutch actuation when the degree of oscillation of the crank is varied.

34. In a variable speed transmission, a rotatable driving element, a plurality of crank mechanisms carried by said element, and translatably rotated about the axis of the element when the element rotates, a planetary gear associated with each crank, clutch mechanisms for coupling the respective crank and planetary gears when the speed of rotation of the crank tends to exceed that of its associated planetary gear, a sun gear driven by the planetary gears, means for effecting a complete cycle of oscillation of said crank about its axis during one revolution of the driving element, and means for actuating said clutch mechanisms when throughout a sector of the revolution of the driving element, the last mentioned means being affected by the first mentioned means for angularly shifting said sector of clutch actuation when the degree of oscillation of the crank is varied.

35. In a variable speed transmission, a rotatable driving element, a crank mechanism carried by said element and translatably rotated about the axis of the element by the element, a gear associated with the crank, clutch mechanism for coupling the crank and gear, a gear driven by the first mentioned gear, means for effecting a complete cycle of oscillation of said crank about its axis during one revolution of the driving element and for selectively varying the degree of oscillation of the crank, cam means for actuating said clutch mechanism during the time the crank mechanism passes through a sector of the revolution of the driving element, said cam means being rotatable about the axis of the driving element for angularly shifting said sector of clutch actuation, and means for operatively linking the crank oscillating means and the cam means whereby variation of the degree of oscillation of the crank will cause shifting of the sector of clutch actuation.

ELIAS ORSHANSKY, Jr.

REFERENCES CITED

The following references are of record in the file of this patent:

UNITED STATES PATENTS

| Number | Name | Date |
| --- | --- | --- |
| 862,425 | DeVeulle | Aug. 6, 1907 |
| 1,570,727 | Carrasco-Sanchez | Jan. 26, 1926 |
| 1,624,835 | Hatcher | Apr. 12, 1927 |
| 1,732,247 | Tornberg | Oct. 22, 1929 |
| 2,036,133 | Goltsch | Mar. 31, 1936 |
| 2,178,784 | Ewart | Nov. 7, 1939 |